(12) United States Patent
Sakurai (10) Patent No.: US 7,144,122 B2
(45) Date of Patent: Dec. 5, 2006

(54) PROJECTOR

(75) Inventor: Teruo Sakurai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 11/198,282

(22) Filed: Aug. 8, 2005

(65) Prior Publication Data
US 2006/0044513 A1   Mar. 2, 2006

(30) Foreign Application Priority Data
Sep. 2, 2004 (JP) ............................. 2004-256170

(51) Int. Cl.
*G03B 21/16* (2006.01)
(52) U.S. Cl. ........................................ 353/119; 353/61
(58) Field of Classification Search ................ 353/119, 353/52, 60, 61, 122; 349/5, 7, 8, 9
See application file for complete search history.

(56) References Cited

U.S. PATENT DOCUMENTS 5,461,437 A * 10/1995 Tanaka et al. ................ 353/71
2005/0024604 A1 * 2/2005 Ho et al. ...................... 353/119
2005/0083486 A1 * 4/2005 Johnson ......................... 353/15
2005/0088620 A1 * 4/2005 Dwyer et al. ................. 353/15
2005/0088621 A1 * 4/2005 Ikeuchi ......................... 353/15

FOREIGN PATENT DOCUMENTS

| JP | A 06-138433 | 5/1994 |
| JP | A 07-113996 | 5/1995 |
| JP | A 08-304739 | 11/1996 |

* cited by examiner

Primary Examiner—William C. Dowling
(74) Attorney, Agent, or Firm—Oliff & Berridge, PLC (57) ABSTRACT

A projector includes a projector body that enlarges and projects image light and an image reproducing device that reproduces an image relating to the image light. The projector body and the image reproducing device are integrally arranged in a vertical direction such that the projector body is above the image reproducing device. A partition member is formed between the projector body and the image reproducing device, and the projector body is placed on the partition member.

5 Claims, 11 Drawing Sheets

PROJECTOR

This application claims the benefit of Japanese Patent Application No. 2004-256170, filed Sep. 2, 2004. The entire disclosure of the prior application is hereby incorporated by reference herein in its entirety.

BACKGROUND

The exemplary embodiments relate to a complex projector into which a projector body and an image reproducing device such as a digital versatile disc (hereinafter, referred to as DVD) are integrated.

In the related art, a projector modulates a light beam emitted from a light source and projects the modulated light beam via a projection lens on to a screen. This projector is widely used for presentations, in, for example, a conference, or the like, along with a personal computer (PC).

In such a projector, a color-separating optical system such as a dichroic mirror separates the light beam from a light source into three light components, and three optical modulators composed of liquid crystal panels, or the like, modulate the respective color light components according to image information thereof. Further, in the related art, a projector has a three-plate structure in which a color-combining optical device, such as a cross dichroic prism, combines the respective color components after the modulation to form an optical image, and a projection optical device such as a projection lens enlarges and projects the formed optical image.

Further, with the recent multi-functionality of a projector, the projector can output sound as well as project an image. Therefore, the number of projectors having a built-in sound reproducing device such as a speaker is increasing. With regard to the speaker, a stereo speaker is frequently used in order to give realistic sensation (for example, see JP-A-6-138433 (Paragraph [0021], FIG. 5)).

Moreover, with the recent multi-functionality of projectors, there has been widely provided with a home-theater system which can easily and conveniently reproduce pictures with the same image quality as pictures shown in theaters. Thus, a complex projector in which a projector body and an image reproducing device are integrated can be used as a home theater (for example, see JP-A-7-113996 (Claim 1, FIG. 4). Although DVD players, video cassette recorders, or the like are often used as image reproducing devices, DVD players are prevailingly used because of excellent image quality or easy handling of image sources.

However, generally, the projector generates a large amount of heat. When such a projector is integrated with an image reproducing device such as the DVD player, the image reproducing device also generates heat. Therefore, there are problems in that studies on arrangements for integrating the DVD player and the image reproducing device are needed, efficient cooling cannot be performed, and the reduction in size of the projector becomes difficult.

SUMMARY

The exemplary embodiments provide a projector capable of efficiently cooling a projector body and an image reproducing device, and capable of facilitating a reduction in size by dwarfing an occupying area.

According to an aspect of the exemplary embodiments, a projector is provided which includes a projector body including , ea light source, a color-separating optical system that separates a light beam emitted from the light source into a plurality of color light components, a plurality of optical modulators that modulate the separated color light components according to image information, a color-combining optical device that combines the beams modulated by the plurality of optical modulators, and a projection optical device that enlarges and projects image light combined by the color-combining optical device; and an image reproducing device that reproduces an image relating to the image light. The projector body and the image reproducing device are integrally arranged in a vertical direction such that the projector body is above the image reproducing device. A partition member is formed between the projector body and the image reproducing device, and the projector body is placed on the partition member.

The image reproducing device includes, for example, DVD players, video cassette recorders, etc.

According to the above structure, since the projector body and the image reproducing device are integrally arranged in a vertical direction such that the projector body is above the image reproducing device, the occupying area of the whole product can be made small, so that the size of the projector can be reduced.

Further, since the projector body is above the image reproducing device, the projector becomes suitable for upward projection. Moreover, since the projector body generates a much larger amount of heat than the image reproducing device, the projector body is disposed above the image reproducing device, so that the heat of the projector body can be kept from affecting the image reproducing device.

Since the partition member is formed between the projector body and the image reproducing device, and the projector body is placed on the top surface of the partition member, both devices can be reliably separated from each other. Further, since the projector body is also placed on the partition member, the projector can be placed stably.

Further, the partition member may be integrally formed with at least one of a part of or all of a duct in the projector body and the image reproducing device.

Since the partition member formed between the projector body and the image reproducing device may be integrally formed with at least one of a part of or all of a duct in the projector body and the image reproducing device, suction or exhaust of air in the projector body or the image reproducing device can be enhanced and performed well. Further, since it is unnecessary to separately provide the duct, the number of members can be reduced, which makes it possible to reduce cost.

Further, the partition member may be formed with an introducing port that introduces heat from the image reproducing device.

Since the partition member formed between the projector body and the image reproducing device may be formed with the introducing port which introduces heat from the image reproducing device, the heat of the image reproducing device existing below the partition member is delivered to the projector placed on the partition member, so that cooling of the image reproducing device can be efficiently implemented.

Further, a heat generating portion in the image reproducing device may be disposed right below or around the introducing port, and a portion of the partition member facing the projector body may be provided with a duct that communicates with the introducing port by air flow.

Since the heat generating portion in the image reproducing device may be disposed right below or around the introducing port formed in the partition member, the heat generated in the image reproducing device passes through the introducing port. Further, since the duct communicating with the introducing port is disposed at a portion of the partition member facing the projector body, the heat which has passed through the introducing port is discharged through the duct to the outside, so that heat radiation or cooling can be more efficiently performed.

The heat generating portion may include, for example, a driving unit of a DVD player that is the image reproducing device, a pickup that is an optical component which reads digital video signals recorded on a loaded DVD, and/or the like.

Further, the partition member may be integrally formed with a lateral side that surrounds the projector body, and the lateral side may be formed with a peripheral rib that surrounds a front end of the projection optical device.

Since the partition member may be integrally formed with the lateral side that surrounds the projector body, and the lateral side may be formed with the peripheral rib that surrounds the front end of the projection optical device (projection lens), the projection direction can be made correct, and the projection efficiency can be enhanced or optimized.

Further, since the peripheral rib is integrally formed with the lateral side integrated with partition member, the number of parts can be reduced so that the cost can be further reduced.

Further, an exhaust unit of the projector body and an exhaust unit of the image reproducing device may be arranged adjacent to each other.

Since the exhaust unit of the projector body and the exhaust unit of the image reproducing device are arranged adjacent to each other, the exhaust of both of the exhaust units can be performed in the same direction, and the exhaust efficiency of the apparatus can be enhanced or improved.

Further, the image reproducing device may be a digital versatile disc (DVD) player.

The DVD player may be employed as the image reproducing device to be disposed in the projector, whereby it is possible to provide an integrated projector body-DVD player projector which exhibits the above-mentioned advantages.

BRIEF DESCRIPTION OF THE DRAWINGS

The exemplary embodiments will be described with reference to the accompanying drawings, wherein like numbers reference like elements, and wherein.

DETAILED DESCRIPTION OF EMBODIMENTS

Hereinafter, exemplary embodiments of the invention will now be described with reference to the accompanying drawings.

First Exemplary Embodiment (I) External Structure of Projector

Figure 1:
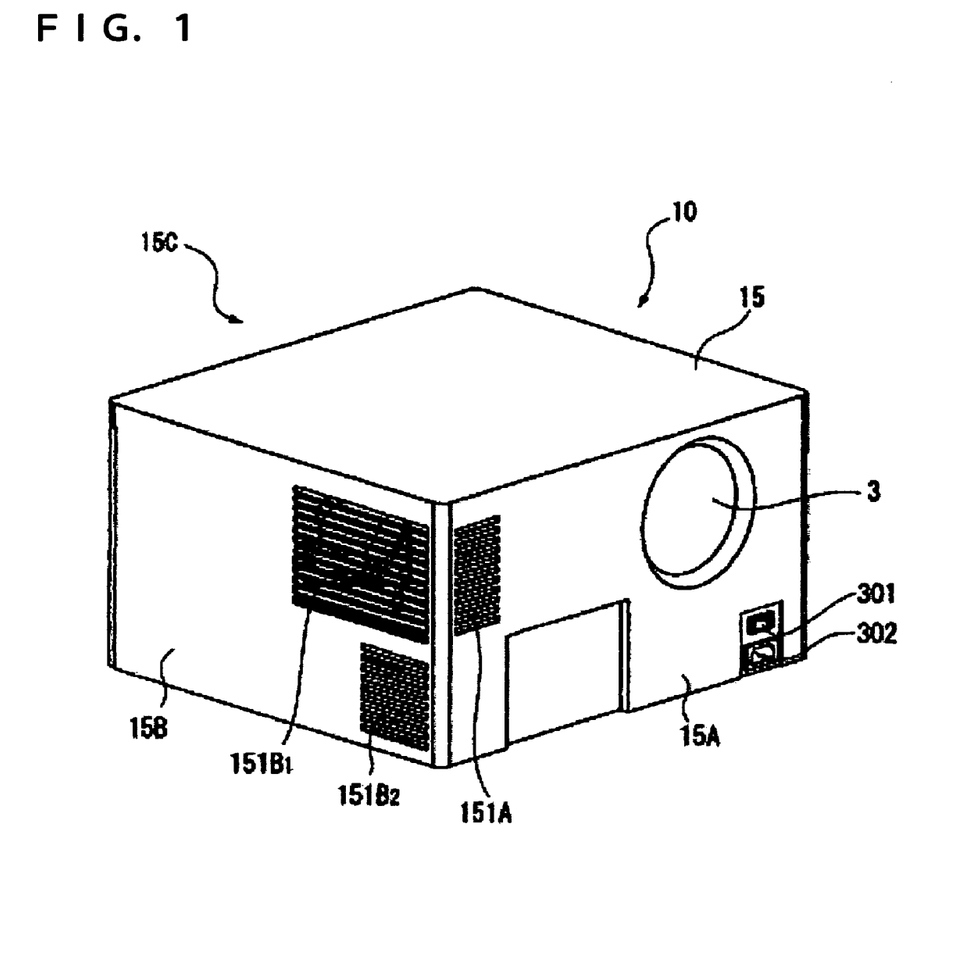
FIG. 1 is a perspective view of a projector according to a first exemplary embodiment of the invention, as seen from the front side.
Figure 2:
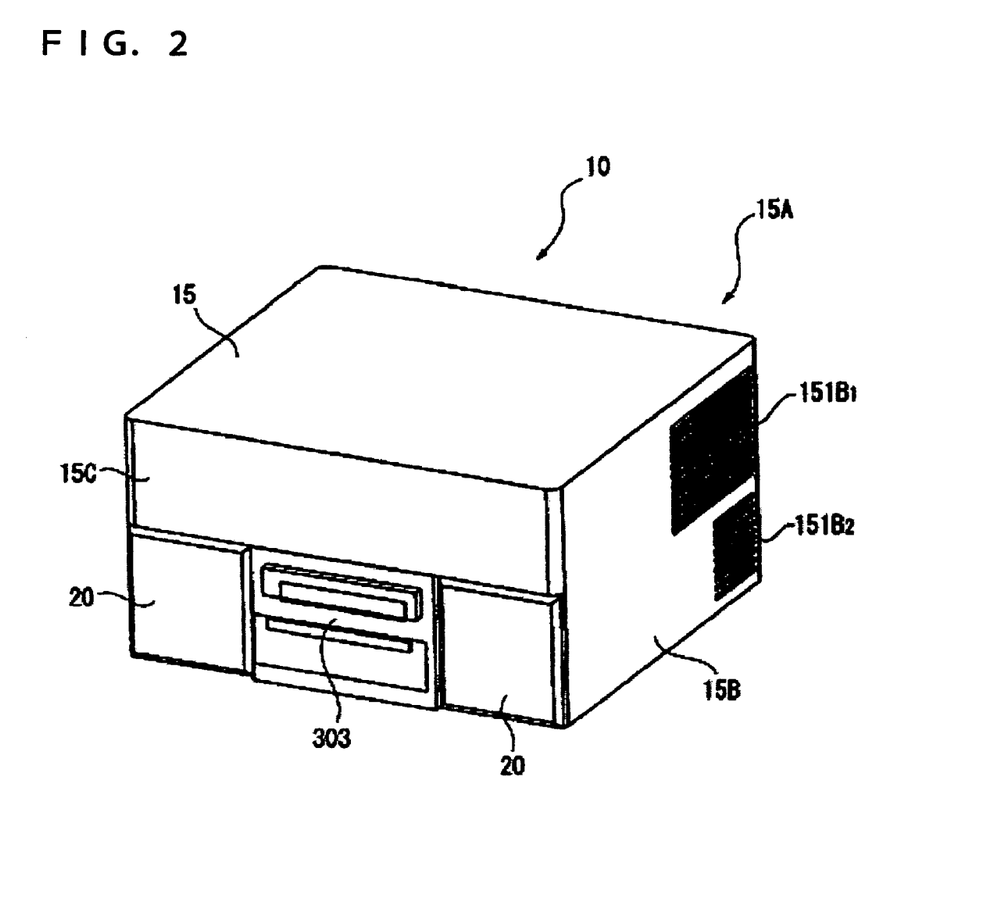
FIG. 2 is a perspective view of the projector according to the first exemplary embodiment of the invention, as seen from the back side.

FIG. 1 is a perspective view of a projector 10 according to the present exemplary embodiment, as seen from the front side, and FIG. 2 is a perspective view of the projector 10, as seen from the back side.

The projector 10 accommodates a projector body 1 composed of an optical system 4 (see FIG. 3), which will be described later, within an exterior case 15 that is a housing that may have a substantially rectangular parallelepiped shape. The projector body 1 modulates a light beam emitted from a light source according to image information, and magnifies image light combined after the light modulation to project the enlarged image light onto a projection surface, such as a screen, from a projection lens 3.

Further, the projector 10 of the present exemplary embodiment, which will be described in detail below, is a complex projector including a DVD player 30 (see FIG. 4) that is an image reproducing device, which reproduces images relating to image light. The projector body 1 and the DVD player 30 are integrally arranged in a vertical direction such that the projector body 1 is above the DVD player 30 within the external case 15.

Although it will be described in detail below, within the external case 15, a partition member 50 is formed between the projector body 1 and the DVD player 30, and the projector body 1 is placed on the top surface of the partition member 50 (see FIG. 5).

In addition, in the projector 10, a speaker that is a sound generating unit, which generates sound relating to image light, is disposed inside two cover members 20 (see FIG. 2). When the projector body 1 projects image light, the speaker is also driven to reproduce sound corresponding to the image light. The speaker is also accommodated in the external case 15 along with the above-mentioned projector body 1 and the DVD player 30.

The external case 15 which accommodates the projector body 1 and the DVD player 30 is a housing made of a synthetic resin and having a substantially rectangular plane. As shown in FIG. 1, the projection lens 3 is exposed at a front face 15A. The projection lens 3 may serve as an optical projection unit (an optical projection system), which magnifies and projects an optical image which is modulated and formed by a liquid crystal panel serving as an optical modulator. The projection lens 3 is constructed as a group of lenses in such a way that a plurality of lenses is accommodated in a lens holding barrel (not shown).

As shown in FIG. 1, the front face 15A (the surface at which the projection lens 3 is exposed) of the external case 15 of the projector 1, and a left lateral side 15B as seen from the front face 15A, are formed with exhaust openings 151A, 151B$_1$, and 151B$_2$. The exhaust openings 151A, 151B$_1$, and 151B$_2$ are openings which discharges heat generated from the projector body 1 or the DVD player 30 within the external case 15 to the outside. In the present exemplary embodiment, several elongated and substantially rectangular air gaps are juxtaposed horizontally to form the exhaust openings 151A, 151B$_1$, and 151B$_2$.

Further, as shown in FIG. 1, the front face 15A of the external case 15 of the projector 1 is formed with a power switch 301 which supplies power, and an inlet connector 302 for attachment to an AC power cord.

In addition, FIG. 1 illustrates an example in which the front face 15A of the external case 15 is formed with one exhaust opening 151A, and the left lateral side of the external case 15 is formed with two exhaust openings 151B$_1$ and 151B$_2$. Among the two exhaust openings 151B$_1$ and 151B$_2$ of the left lateral side 15B, the upper exhaust opening 151B$_1$ communicates with the exhaust unit 73 of the projector body 1, and the lower exhausting opening 151B$_2$ communicates with an exhaust unit of the DVD player 30 (see FIG. 4).

Further, although not shown, several elongated and substantially rectangular air gaps are vertically juxtaposed at a right side of the case 15, as seen from the front face of the external case 15, to form two suction openings. Among the two suction openings of the right side, the upper suction opening communicates with a suction unit 72 of the projector body 1, and the lower suction opening communicates with a suction unit 74 of the DVD player 30 (see FIG. 4). The upper suction opening is an opening which introduces outside air for cooling the projector body 1 disposed within the external case 15.

As shown in FIG. 2, two planar cover members 20 are arranged on the right and left lateral sides of a rear face 15c of the external case 15. The inside of the cover member 20 is formed with a sound emitting port in which a speaker (not shown) serving as a sound reproducing device is disposed. The cover member 20 is provided for covering the sound emitting port. Further, the sound emitting port of the speaker is an opening into which a speaker (not shown) is assembled and positioned. Conforming to the shape of the speaker, a rectangular opening or a square opening is formed as the sound emitting port.

In addition, the two sound emitting ports (two in total) are formed one by one at each of the right and left lower portions of the rear face 15C of the external case. These two sound emitting ports are covered with the cover members 20.

The speakers (not shown) serving as sound reproducing devices which are arranged inside the two cover members 20 shown in FIG. 2, may be cone-shaped speakers, each including a substantially rectangular parallelepiped speaker cabinet composed of a conical vibrating plate and an outer package member of the speaker.

Further, the speakers of the projector 10 of the present exemplary embodiment may be stereo-type speakers. Although not shown, the speakers may be disposed one by one at each of the sound emitting ports formed on the right and left lateral sides of the rear face 15C of the external case 15.

(II) Structure of Optical System

Figure 3:
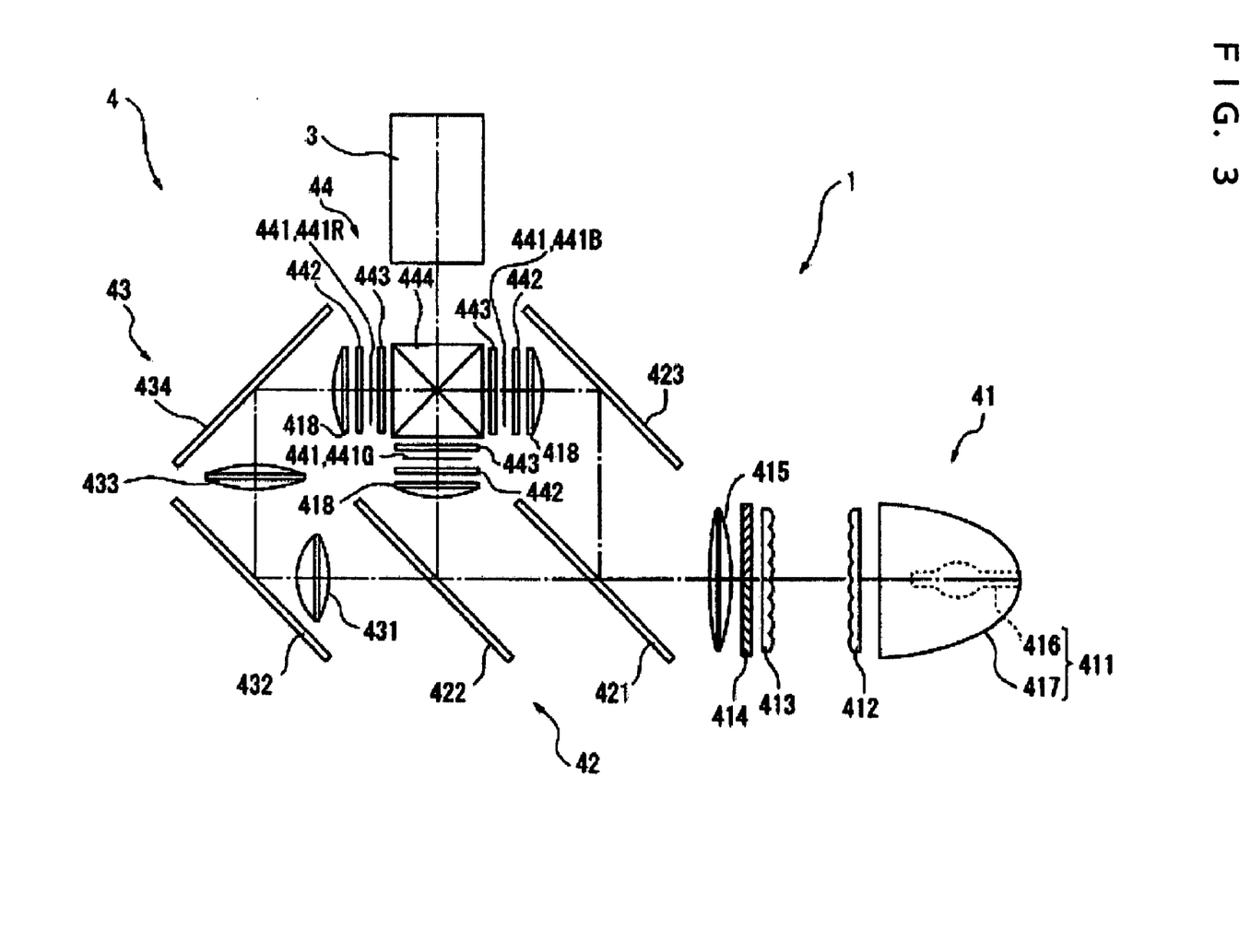
FIG. 3 is a schematic showing the structure of an optical system of a projector body in an exemplary embodiment.

FIG. 3 is a schematic showing the structure of the optical system 4 of the projector body 1 of the present exemplary embodiment.

The projector body 1 of the present exemplary embodiment includes an integrator illumination optical system 41, a color-separating optical system 42, a relay optical system 43, an optical device 44 into which an optical modulator and a color-combining optical device are integrated, and a projection lens 3 serving as a projection optical device.

The integrator illumination optical system 41 is an optical system which keeps the illumination of the light beam emitted from the light source at a uniform intensity in the plane orthogonal to an illumination light axis. The integrator illumination optical system 4 includes a light source unit 411, a first lens array 412, a second lens array 413, a polarization conversion element 414, and a superposed lens 415.

The light source unit 411 includes a light source lamp 416 serving as a radiating light source, and a reflector 417. The radiant rays emitted from the light source lamp 416 are reflected by the reflector 417 to be substantially collimated rays, and are emitted to the outside. Although a high-voltage mercury lamp is employed as the light source lamp 416 in the present exemplary embodiment, a metal halide lamp or a halogen lamp other than the mercury lamp may be employed. Further, although a parabolic mirror is employed as the reflector 417 in the present exemplary embodiment, it is possible to employ a structure in which a collimating concave lens is disposed on a projection surface of a reflector composed of an ellipsoidal mirror.

The first lens array 412 has a structure in which small lenses having a substantially rectangular outline as seen from the direction of the illumination light axis are arranged in a matrix. Each small lens splits a light beam emitted from the light source lamp 416 into partial light beams to project in the direction of the illumination light axis. The outline of each of the small lenses is set to have almost the same shape as the shape of an image forming region of the liquid crystal panel 441 which will be described later.

The second lens array 413 has almost the same structure as the first lens array 412, and has a structure in which small lenses are arranged in a matrix. The second lens array 413 focuses images of the small lenses of the first lens array 412 on the liquid crystal panel 441 together with the superposed lens 415.

The polarization conversion element 414 is to convert the light from the second lens array 413 into one type of polarized light. This makes it possible to improve or enhance utilization efficiency of light in the optical device 44.

Specifically, each partial light beam converted into one type of polarized light by the polarization conversion element 414 is approximately superimposed finally on the liquid crystal panel 441 of the optical device 44 by the superposed lens 414. Since only one type of polarized light can be utilized in the projector using the liquid crystal panel 441 of type which modulates polarized light, almost half of the light beam from the light source lamp 416, which emits randomly polarized light, is not utilized.

Therefore, the polarization conversion element 414 is used to convert the light beam from the light source lamp 416 into substantially one type of polarized light, thereby improving the utilization efficiency in the optical device 44. In addition, such a polarization conversion element 414 is disclosed in, for example, JP-A-8-304739.

The color-separating optical system 42 includes two dichroic mirrors 421 and 422, and a reflecting mirror 423, and has a function to separate a plurality of partial light beams emitted from the integrator illumination optical system 41 by the dichroic mirrors 421 and 422 into three color light components of red (R), green (G) and blue (B).

The relay optical system 43 includes an incident-side lens 431, a relay lens 433, and reflecting mirrors 432 and 434, and guides red light components, separated by the color-separating optical system 42, to the liquid crystal panel 441R.

Accordingly, in the dichroic mirror 421 of the color-separating optical system 42, among the light beams emitted from the integrator illumination optical system 41, the red light component and the green light component are transmitted, and the blue light component is reflected. The blue light component reflected by the dichroic mirror 421 is reflected by the reflecting mirror 423, and reaches a liquid crystal panel 441B for blue light component through a field lens 418. The field lens 418 converts respective partial light beams emitted from the second lens array 413 into light fluxes parallel to its center axis (principal ray). This is true of field lenses 418 provided on the light incidence side of other liquid crystal panels 441G and 441R.

Further, among the red light component and the green light component transmitted through the dichroic mirror 421, the green light component is reflected by the dichroic mirror 422, and reaches the liquid crystal panel 441G for green light component through the field lens 418. The red light component is transmitted through the dichroic mirror 422, and reaches the liquid crystal panel 441R for red light component through the field lens 418.

The relay lens 43 is used for red light component so that the length of an optical path of the red light component is larger than that of other color light components. This prevents the degradation of utilization efficiency of light caused by light divergence. In other words, this makes the partial light beams incident on the incident-side lens 431 transmitted to the field lens 418 intact. Moreover, the relaying optical lens 43 is constructed to transmit red light component of the three color light components. However, the relaying optical lens is not limited to such a construction, and may be configured to, for example, a blue light component.

The optical device 44 modulates incident light beams to form a color image, and includes three incident-side polarizing plates 442 on which respective color light components separated by the color-separating optical system 42 are incident, liquid crystal panels 441 (441R, 441G, and 441B) serving as light modulation elements which are arranged at rear stages of the respective incident-side polarizing plates 442, and emitting-side polarizing plates 443 which are arranged at rear stages of the respective liquid crystal panels (441R, 441G, and 441B), and cross dichroic prisms 444 serving as color-synthesizing optical systems.

The liquid crystal panels (441R, 441G, and 441B) are obtained by enclosing liquid crystal serving as an electro-optical material between a pair of transparent glass substrates. For example, the liquid crystal panels modulate the polarization direction of polarized light beams emitted from the incident-side polarizing plates 442 according to given image signals by using poly-silicon TFTs as switching elements. The image forming region where the modulation of the liquid crystal panels 441R, 441G, and 441B are performed is rectangular, and its diagonal dimension is, for example, about 0.7 inches.

Also, the respective color light components separated by the color-separating optical system 42 are modulated according to image information by the three liquid crystal panels 441R, 441G, and 441B, the incident-side polarizing plates 442, and the emitting-side polarizing plates 443, to form an optical image.

The incident-side polarizing plate 442 transmits unidirectional polarized light alone, among the respective color light components separated by the color-separating optical system 42, and absorbs the other light beams. The incident-side polarizing plates are constructed, for example, as a polarizing film is attached to a substrate such as sapphire glass. Further, a polarizing film may be attached to the field lens 418 without using a substrate.

The emitting-side polarizing plates 443 are also constructed almost in the same manner as the incident-side polarizing plates 442, and transmit only polarized light having a predetermined direction, among the light beams emitted from the liquid crystal panels 441 (441R, 441G, and 441B), and absorbs the other light beams. Further, a polarizing film may be attached to the cross dichroic prisms 444 without using a substrate.

The incident-side polarizing plates 442 and the emitting-side polarizing plates 443 are set such that the direction of polarization axes thereof are orthogonal to each other.

The cross dichroic prism 444 combines an optical image which is emitted from the emitting-side polarizing plates 443 and modulated by every color light component, thereby forming a color image.

In the cross dichroic prism 444, a dielectric multilayer film which reflects a red light component and a dielectric multilayer film which reflects a blue light component are provided substantially in an X-shape along interfaces of the four rectangular prisms. The three color light components are combined by these dielectric multilayer films.

Moreover, the color image combined by the prism 444 is emitted from the projection lens 3, and is enlarged and projected onto a screen.

Figure 4:
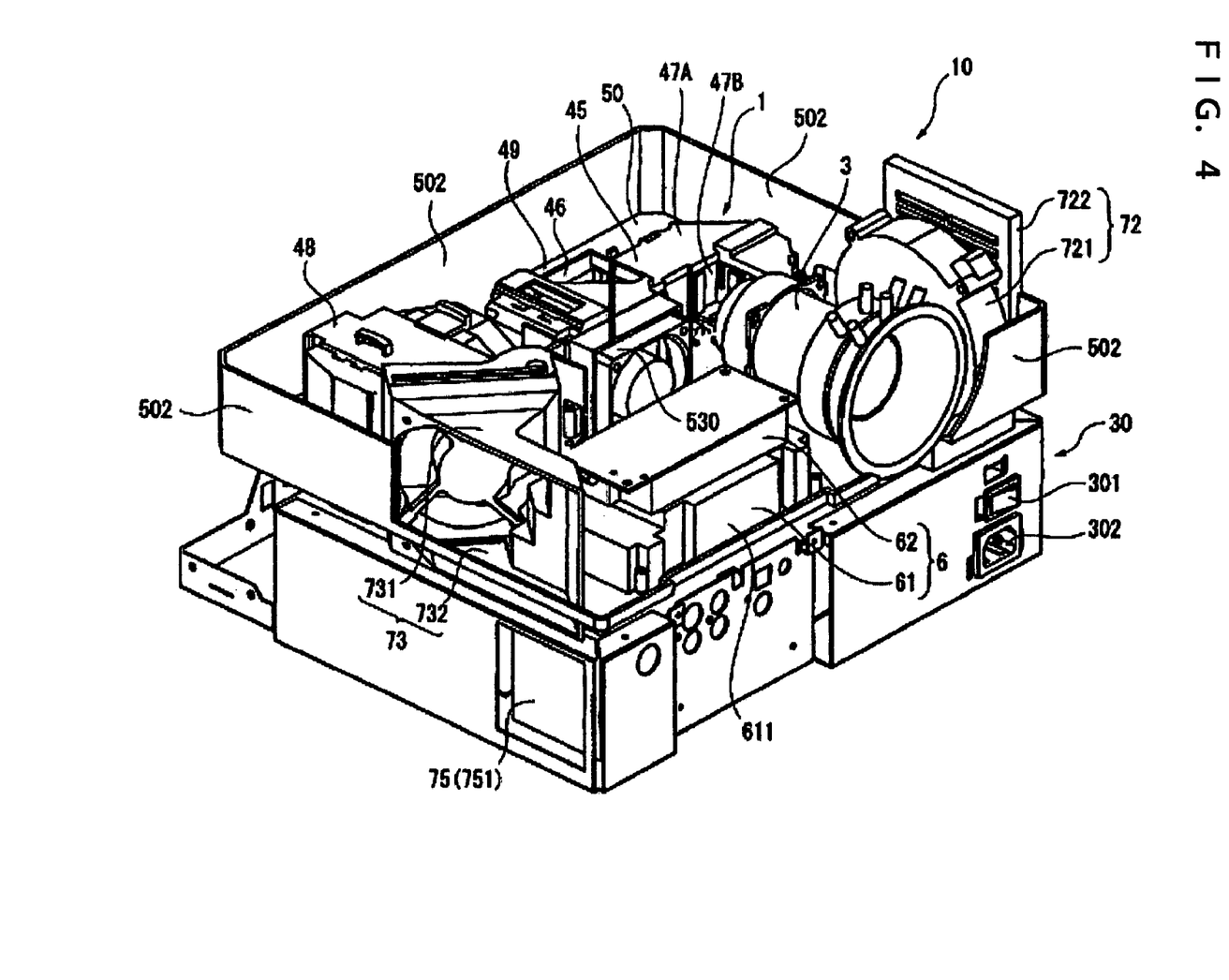
FIG. 4 is a perspective view showing an internal structure of the projector according to the first exemplary embodiment of the invention, as seen from the front side.
Figure 5:
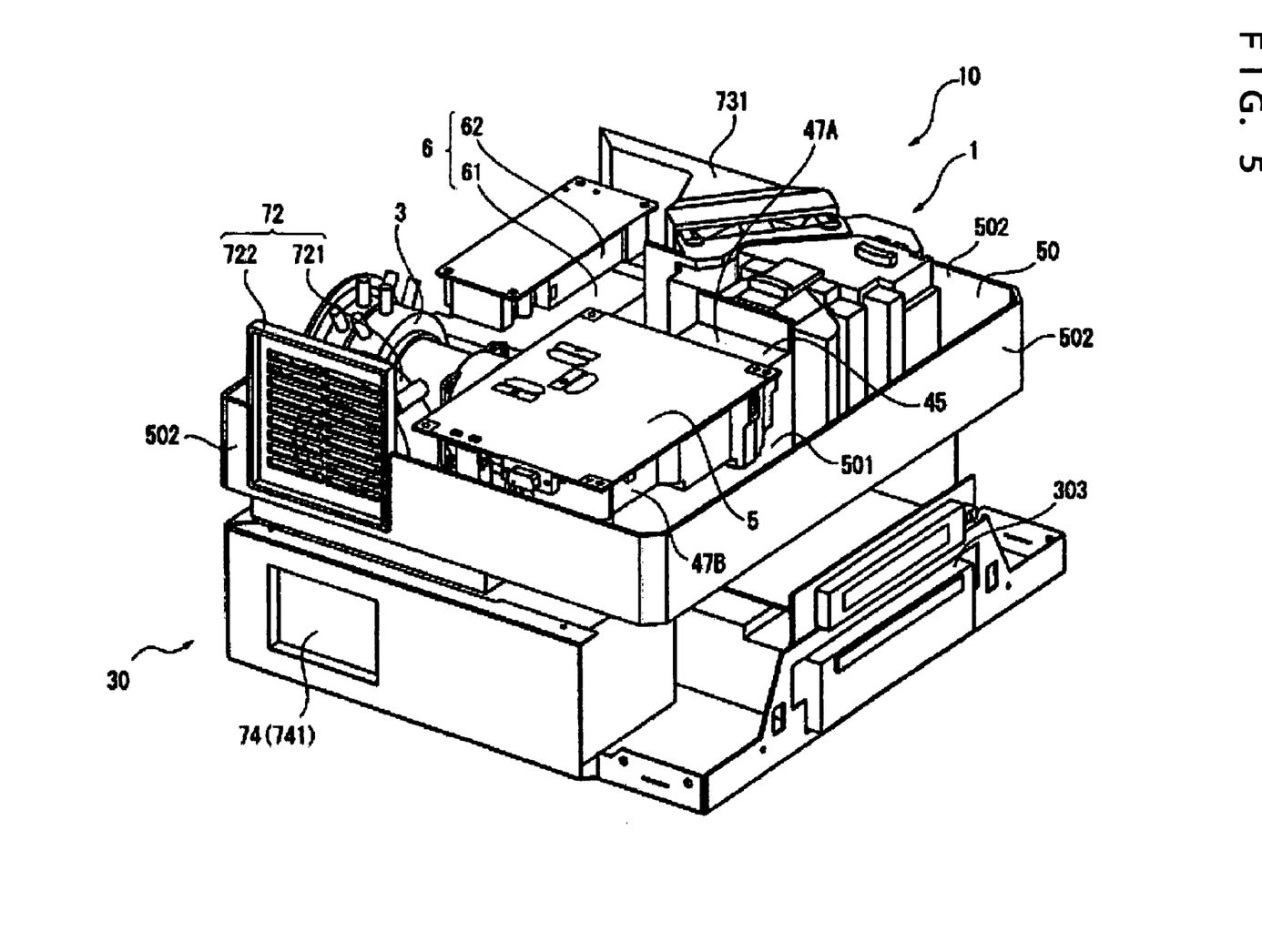
FIG. 5 is a perspective view showing an internal structure of the projector according to the first exemplary embodiment of the invention, as seen from the back side.

Also, the optical system having such a structure is accommodated in, for example, a substantially L-shaped (in plan view) housing 45 for the optical system, as shown in FIGS. 4 and 5.

(III) Internal Structure of Projector 10

FIGS. 4 and 5 are perspective views showing an internal structure of the projector 10, FIG. 4 is a perspective view as seen from the front side, and FIG. 5 is a perspective view as seen from the back side. Both of these drawings show a state where the external case 15 is detached from the projector 10.

Figure 6:
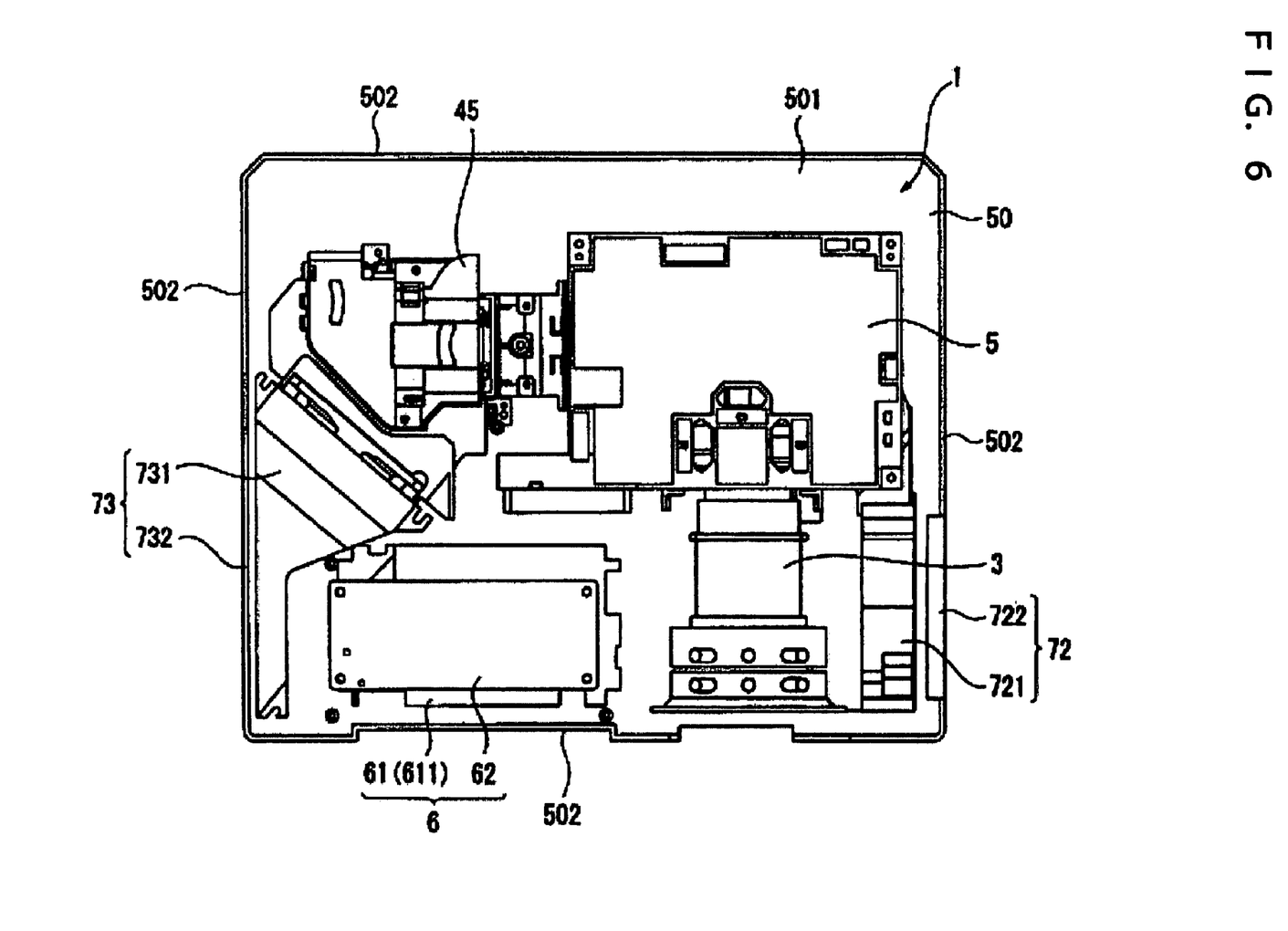
FIG. 6 is a plan view of the projector body in an exemplary embodiment.
Figure 7:
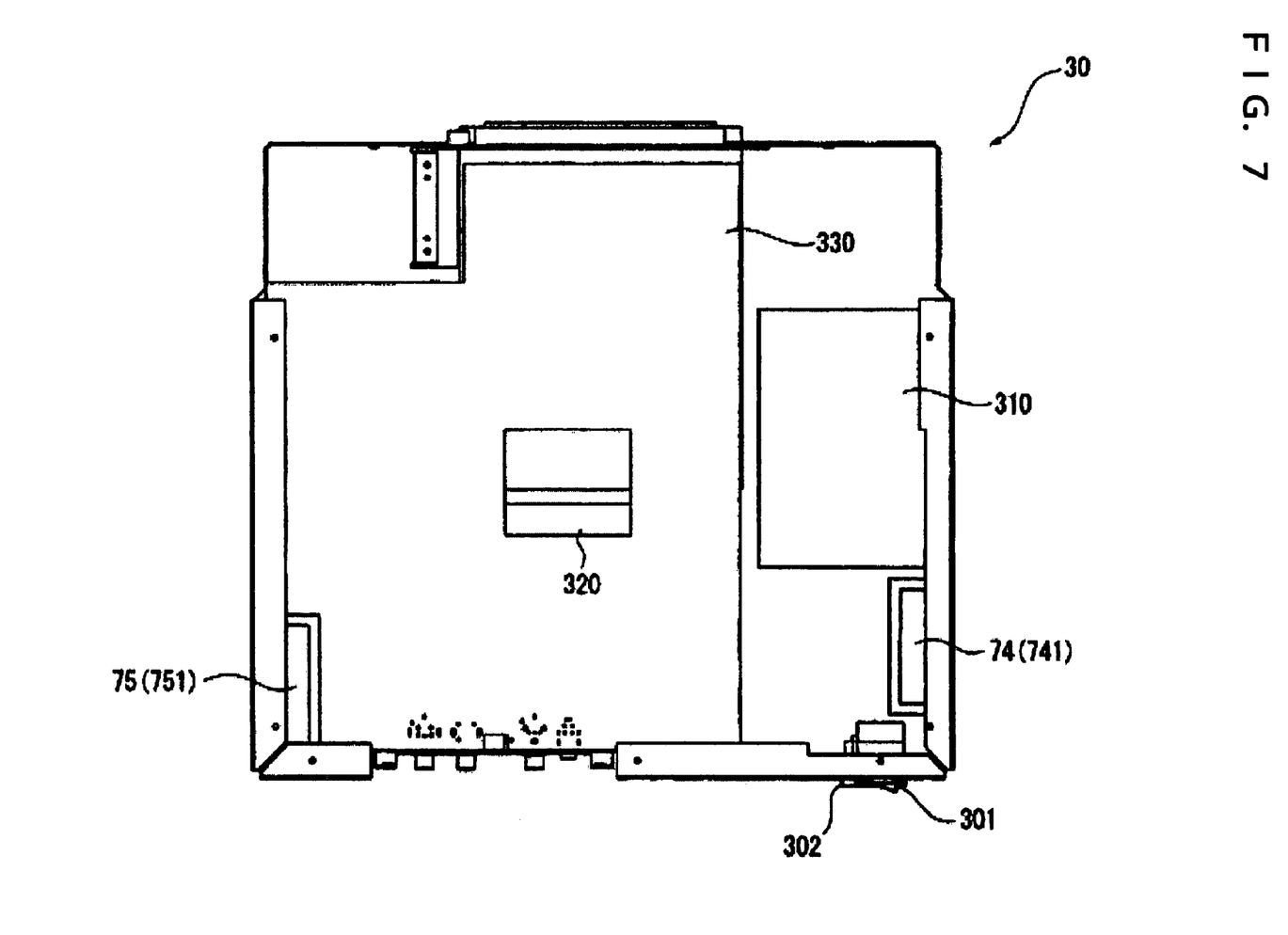
FIG. 7 is a plan view of a DVD player that is an image reproducing device in an exemplary embodiment.

FIG. 6 is a plan view of the projector body 1, and FIG. 7 is a plan view of the DVD player 30.

(III-a) Structure of Projector Body 1

As shown in FIGS. 4 to 6, the projector body 1 is disposed at the upper portion with the partition member 50 interposed between the projector body and the DVD player, and accommodated in the substantially L-shaped (in plan view) optical component housing 45. The optical component housing 45 is made of synthetic resin by injection molding, etc., and includes a box-shaped component accommodating member 47B in which optical components are accommodated, and a lid member 47A which covers an opening in the top surface of the component accommodating member 47B. Specifically, the optical component housing 45 includes a light source accommodating portion 48 which accommodates the light source unit 411, and a component accommodating portion 49 which is formed in the shape of a container and which accommodates components other than the light source accommodating portion 411.

The light source accommodating portion 48 is substantially box-shaped. An end face of the light source accommodating portion, at the component accommodating portion 49, is formed with an opening. An end face of the light source accommodating portion opposite to the above end face is also formed with an opening. The opening formed in the end face of the light source accommodating portion at the component accommodating portion 49 is for transmitting light beams emitted from the light source unit 411. Further, the opening formed in the end face of the light source accommodating portion opposite to its end face at the component accommodating portion 49 is an opening for accommodating the light source unit 411, for example, by inserting the light source unit from the lateral side of the light source accommodating portion 48.

The component accommodating portion 49 has a substantially rectangular parallelepiped shape whose top surface is open, and has its one end connected to the light source accommodating portion 48.

Although specific illustration is omitted herein, the component accommodating portion 49 is formed with a plurality of grooves which allows the optical components 412 to 415, 419, 421 to 423, and 431 to 435 to be slidably fitted from the top. Further, the optical device 44 is installed at a portion adjacent to the projection lens 3 of the component accommodating portion 49.

The lid member 47A, constituting the optical component housing 45, covers an upper end opening, except the upper side of the optical device 44, in the component accommodating portion 49 of the component accommodating member 47B. The lid member 47A is formed with a plurality of openings 46 which passes through both of its sides. The air which has cooled the interior of the optical component housing 45 is discharged through the openings 46.

A circuit board 5 is disposed above the aforementioned optical component housing 45 (In addition, the illustration of the circuit board is omitted in FIG. 4).

The circuit board is constructed as a circuit board on which a calculation processing unit such as a CPU (central processing unit) is mounted, and controls the whole projector body 1. The circuit board 5 controls driving of the liquid crystal panels (441R, 441G, and 441B) based on the signals output from interfaces (not shown). Also, the liquid crystal panels 441R, 441G, and 441B implement light modulation to form an optical image.

Further, the circuit board 5 inputs operating signals output from a circuit board of an operating panel (not shown), and from a remote control light-receiving module (not shown), and properly outputs control commands to the components of the projector 10 based on the operating signals.

The power unit 6 supplies power to the light source unit 411, circuit board 5, etc. The power unit 6 includes a power block 61 having a power circuit, and a lamp driving block 62 disposed above the power block 61.

The power block 61 supplies the power supplied from the outside through an AC power cord connected to an inlet connecter (not shown), to the lamp driving block, the circuit board 5, etc. The power block 61 includes a circuit board on one side of which a transformer to convert an inputted alternating current into a low-voltage direct current, and a converting circuit to convert output from the transformer into a predetermined voltage, etc. are mounted. The power block 61 also includes a box member 611 serving as a shielding member which covers the circuit board. The box member 611 is made of aluminum, and is formed substantially in the shape of a box whose both opposite ends are open.

The lamp driving block 62 is a converting circuit to supply power with a stable voltage to the aforementioned power source unit 411. A commercial alternating current input from the power block 61 is rectified and converted into a direct current or an alternating rectangular wave current by the lamp driving block, and is supplied to the power source unit 411.

In addition, the lateral side of such a power unit 6 is provided with an exhaust fan 731 serving as the exhaust unit 73 of the projector body 1. The exhaust fan 731 discharges the air which has cooled the power unit 6 through an exhaust opening 732.

Further, the suction fan 721 serving as the suction unit 72 of the projector body 1, which is disposed at the lateral side of the projection lens 3, introduces air outside of the projector body 1 from a suction opening 722 formed in a lateral side 502 of the partition member 50. The suction fan 721 implements cooling of the respective optical components.

(III-b) Structure of DVD Player 30

The DVD player 30 of the projector 10 is disposed in the lower portion of the projector 10 with the partition member 50 interposed between the DVD player 30 and the projector body 1. As shown in FIG. 4, the front surface (the side where the projection lens 3 is disposed) of the projector 10, is provided with a power switch 301 to input power and an inlet connector 302 for an AC power cord, as also shown in FIG. 1.

Further, the left lateral side of the DVD player 30, as seen from the front side, is formed with an exhaust opening 751 as the exhaust unit 75. An exhaust fan (not shown) is disposed within the exhaust opening 751. In addition, the exhaust opening 751 of the DVD player 30 and the aforementioned exhaust opening 732 of the projector body 1 are arranged adjacent to each other on a same plane of the projector 10.

Furthermore, as shown in FIGS. 1 and 5, the rear surface of the DVD player 30 is formed with a DVD insertion slot 303 to load and unload a DVD on which digital video signals related to an image are recorded. The DVD is loaded into and unloaded from the DVD player 30 through the DVD insertion slot 303.

The right lateral side of the DVD player 30 is formed with a suction opening 741 serving as a suction unit 74, and a suction fan (not shown) is arranged inside the suction opening 741. The suction opening 741 of the DVD player 30 and the above-mentioned suction opening 722 of the projector body 1 are arranged on an equal surface to the projector 10. This is also true of the exhaust openings 732 and 751.

FIG. 7 is a plan view of the DVD player 30. The power unit 310 of the DVD player 30 supplies the power supplied from the outside to a DVD driving unit 320, a circuit board 330, and the like through an AC power cord connected to the inlet connector 302, as also shown in FIG. 4.

In addition, a pickup (not shown) that is an optical component which reads digital signals recorded on a loaded DVD is mounted on the DVD driving unit 320.

The circuit board 330 controls the whole DVD player 30, and outputs digital video signals recorded on the DVD and read by the pickup to the projector body 1. Further, the projector body 1 drives the optical system 4 based on the digital video signals to reproduce an image corresponding to the digital video signals on a liquid crystal panel and then to implement light modulation to form an optical image. Additionally, when the digital video signals are output, a speaker (not shown) is also driven to form an optical image and simultaneously generate sound.

As described above, one lateral side of the DVD player 30 is provided with the suction opening 741 serving as the suction unit 74 and the suction fan (not shown). The suction opening and suction fan are disposed adjacent to the power source unit 310. Further, another lateral side of the DVD player is provided with the exhaust opening 751 serving as the exhaust unit 75 and the exhaust fan (not shown). The suction unit 74 and the exhaust unit 75 are formed adjacent to the suction unit 72 or exhaust unit 73 which are provided in the projector body 1.

(III-c) Structure of Partition Member 50

As shown in FIGS. 4 to 6, the projector body 1 and the DVD player 30 are integrally arranged in a vertical direction such that the projector body 1 is above the DVD player 30. Further, the partition member 50 is formed between the projector body 1 and the DVD player 30, and the projector body 1 is placed on the partition member 50.

Figure 8:
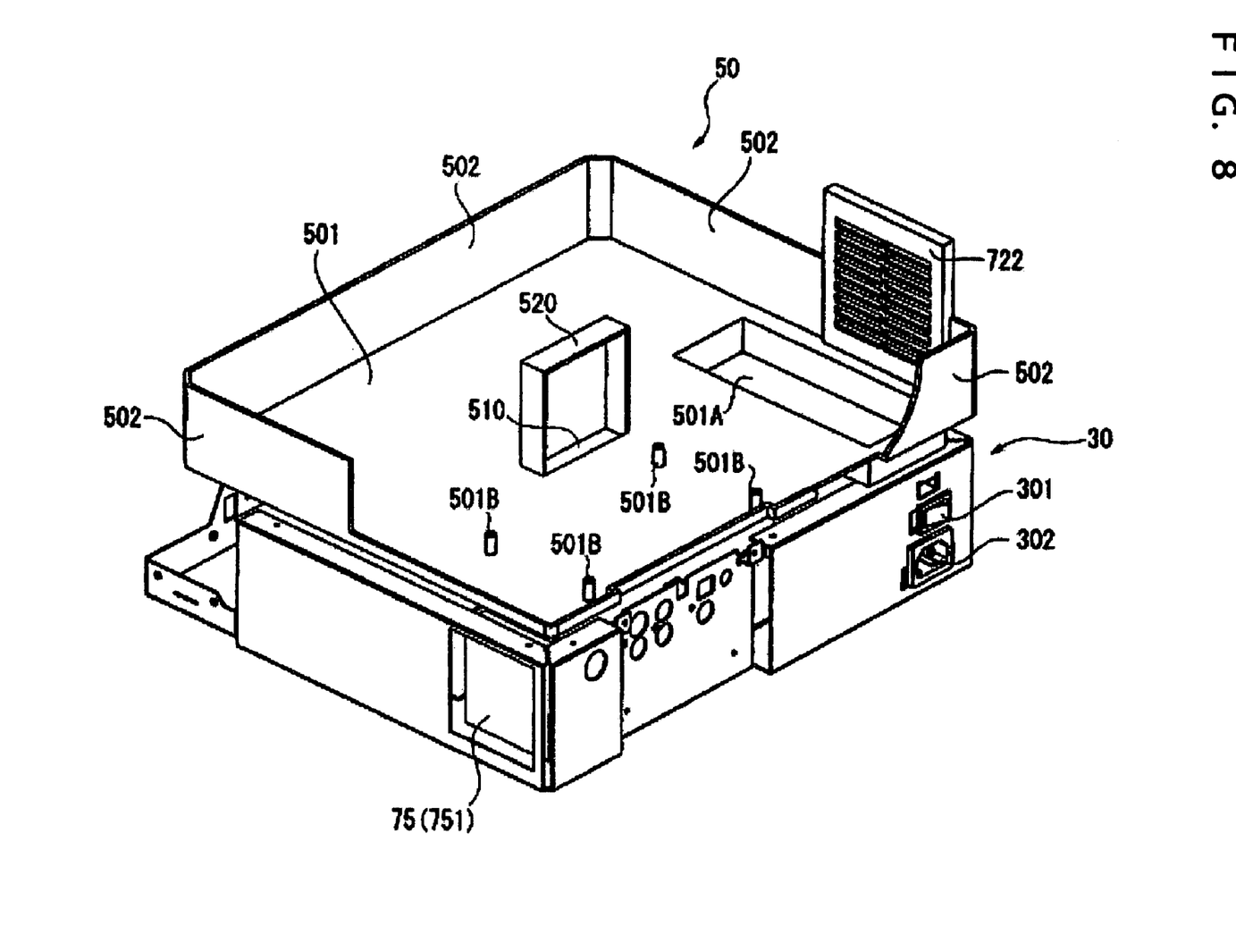
FIG. 8 is a perspective view showing a structure of a partition member in an exemplary embodiment.

FIG. 8 is a perspective view showing a state in which the projector body 1 is detached from the projector in FIG. 4. Hereinafter, the structure of the partition member 50 will be described with reference to FIG. 4 and FIG. 8.

The partition member 50 is an integrally molded product made of synthetic resin. A planer portion 501 having the projector body 1 placed thereon and the lateral sides 502 surrounding the projector body 1 are integrally formed with each other.

In addition, in FIG. 8, a recessed portion 501A is formed in the planar portion 501 is to mount the suction fan 721. (See FIG. 4). Further, the suction opening 722 is formed adjacent to one of the lateral sides 502. Similarly, ribs 501B formed in the planar portion 501 are provided to position and fix the aforementioned power unit 6.

Although the partition member 50 is disposed on the top surface of the DVD player 30 with the projector body 1 placed thereon, the bottom surface of the partition member 50 (the surface of the planar portion 501 facing the DVD player 30) is formed with a supporting member (not shown), thereby the partition member 50 can be stably placed on the top surface of the DVD player 30.

In the partition member 50 including the projector 10 of the present exemplary embodiment, a substantially rectangular introducing port 510 which introduces heat of the DVD player 30 disposed substantially at the lower center of the planar portion 501.

Further, the planar portion 501 of the partition member 50 is integrally formed with a duct 520. Thereby, the introducing port 510 and the duct 520 are in communication with each other by air flow (a state which allows free passage of air from the introducing port 510 to the duct 520). The partition member 50 may be integrally formed with the duct 520 in the projector body 1 or DVD player 30, whereby suction or exhaust of air in the projector body 1 or the DVD player 30 can be performed well.

As shown in FIG. 4, in the projector 10 of the present exemplary embodiment, when the projector body 1 is placed on the partition member 50, a fan 530 is disposed adjacent to the duct 520.

Specifically, the above structure allows the heat generated in the DVD player 30 disposed below the partition member 50 to be delivered from the introducing port 510 to the duct 520 which communicates with the introducing port 510 by air flow. Accordingly, the heat which has past through the introducing port 510 is discharged through the duct 520 to the projector body 1 that is the outside of the DVD player 30. As a result, heat radiation of the DVD player 30 can be efficiently performed.

Moreover, if the fan 530 disposed adjacent to the duct 520 is operated, the heat transferred toward the projector body 1 is properly radiated by the fan 530.

If a heat generating portion in the DVD player 30 is disposed right below the introducing port 510 or there-around, the heat generated in the heat generating portion of the DVD player 30 passes through the introducing port 510 efficiently.

Here, the heat generating portion includes the driving unit 320 of the DVD player 30, specifically, a pickup that is an optical component which reads digital video signals recorded on a loaded DVD.

Figure 9:
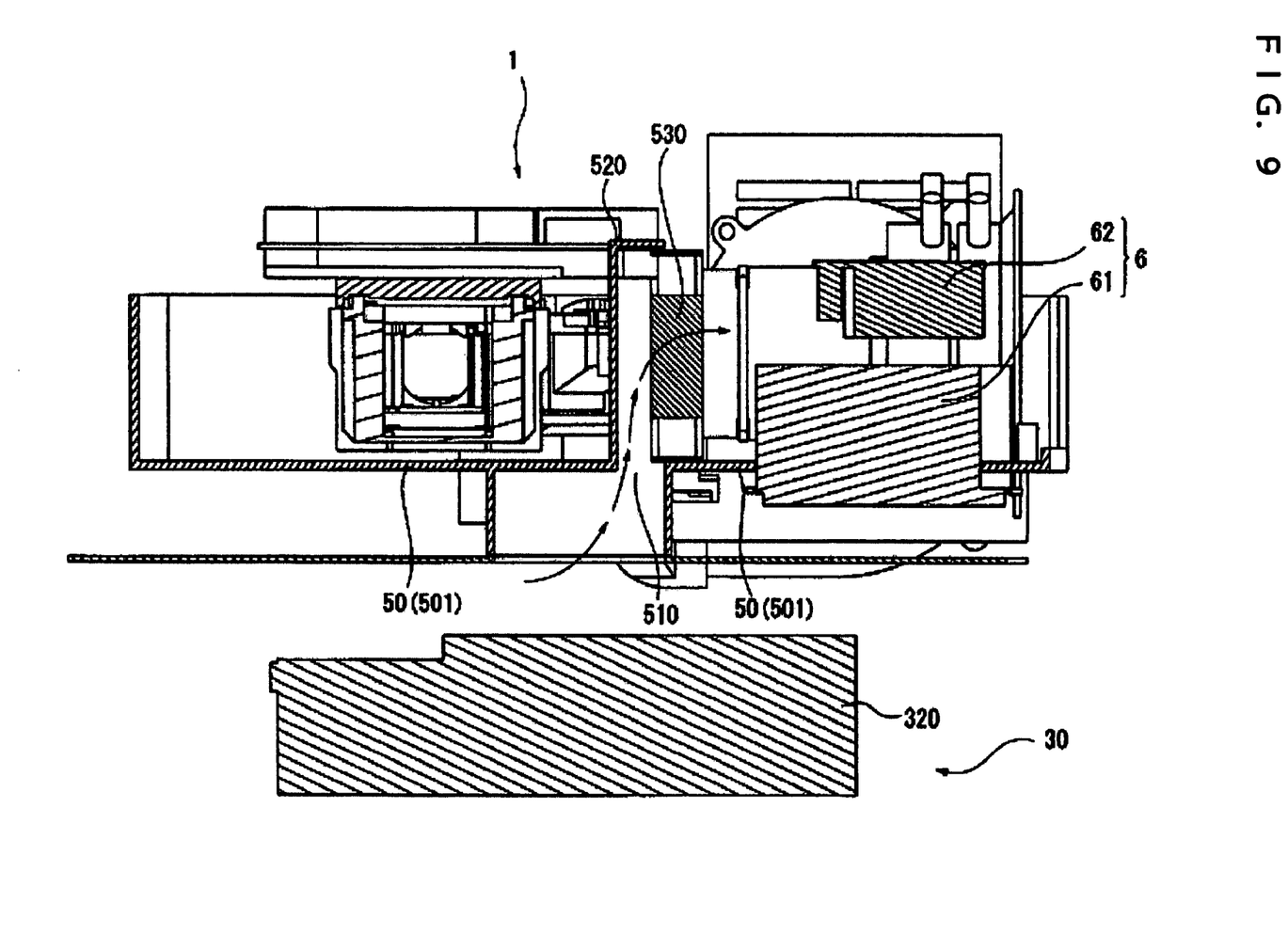
FIG. 9 is a schematic showing the flow of heat which is generated by the DVD player in an exemplary embodiment.

FIG. 9 shows the flow of the heat generated by the DVD player 30 in the projector 10. In FIG. 9, the arrows indicate the flow of heat.

In FIG. 9, the driving unit 320 (a heat generating portion of the DVD player 30) of the DVD player 30 disposed below the partition member 50 is right below the substantially rectangular introducing port 510 formed in the partition member 50.

Further, when the driving unit 320 is operated, and the fan 530 disposed in the projector body 1 placed on the partition member 50 is also operated, the heat generated by the operation of the driving unit 320 is moved toward the introducing port 510 which exists right above the driving unit, and is delivered to the duct 520 which communicates with the introducing port 510 by air flow. Then, the heat is properly radiated by the aforementioned fan 530 disposed adjacent to the duct 520.

(IV) Advantages of First Exemplary Embodiment

According to the projector of the aforementioned first exemplary embodiment, the following advantages can be properly attained.

(1) In the projector 10 including the projector body 1, and the DVD player 30 that is an image reproducing device 30, the projector body 1 and the DVD player 30 are integrally formed in a vertical direction such that the projector body 1 is above the DVD player 30. Therefore, the occupying area of the whole product can be made small, so that the size of the projector 10 can be reduced.

(2) Moreover, since the projector body 1 generates a much larger amount of heat than the DVD player 30, the projector body 1 is disposed above the DVD player, so that the heat of the projector body 1 can be kept from affecting the DVD player 30.

(3) Since the partition member 50 is formed between the projector body 1 and the DVD player 30, and the projector body 1 is placed on the top surface of the partition member 50, both devices can be reliably separated. Further, since the projector body 1 is also placed on the partition member 50, the projector can be placed stably.

(4) Since the partition member 50 formed between the projector body 1 and the DVD player 30 is integrally formed with the duct 520 in the projector body 1 or the DVD player 30, suction or exhaust of air in the projector body 1 or the DVD player 30 can be performed well.

Further, since it is unnecessary to separately provide for the duct 520, the number of parts can be reduced, which makes it possible to reduce cost.

(5) Since the partition member 50 formed between the projector body 1 and the DVD player 30 is formed with the introducing port 510, which introduces heat from the DVD player 30, and a heat generating portion (for example, the driving unit 320 in the DVD player 30) is disposed right below the introducing port 510 formed in the partition member 50, the heat generated in the heat generating portion of the DVD player 30 passes through the introducing port 510. Further, since the duct 520 communicating with the introducing port 510 is disposed at a portion of the partition member 50 facing the projector body 1, the heat which has passed through the introducing port 510 is discharged through the duct 520 to the outside, so that heat radiation or cooling of the DVD player 30 can be efficiently performed.

(6) Since the exhaust unit 73 formed in the projector body 1 and the exhaust unit 75 of the DVD player 30 are arranged adjacent to each other in the same direction, the exhaust of both of the exhaust units can be performed in the same direction, thus the exhaust efficiency of the apparatus can be improved.

(V) Modifications of Exemplary Embodiment

The invention is not limited to the above exemplary embodiments, and it is envisioned that other modifications and improvements are included in the spirit and scope of the invention. Further, specific structures, shapes, and the like, at the time of practice of the exemplary embodiments can be modified or changed to another structure or shape so long as the spirit and scope of the invention can be achieved.

For example, in the aforementioned exemplary embodiment, the partition member 50 is constructed such that the projector body 1 is placed on the planer portion 501, the planar portion 501 and the lateral sides 502 are integrally formed with each other, and the lateral sides 502 surrounds the projector body.

On the other hand, although a portion of the lateral sides 502 corresponding to a front end of the projection lens 3 that is a projection optical device is flat, such a portion may be formed with a peripheral rib 540 which surrounds the front end of the projection lens 3.

In the following description, the same structure and members as those of the first exemplary embodiment are denoted by the same reference numerals, and the detailed description thereof will be omitted or simplified.

Figure 10:
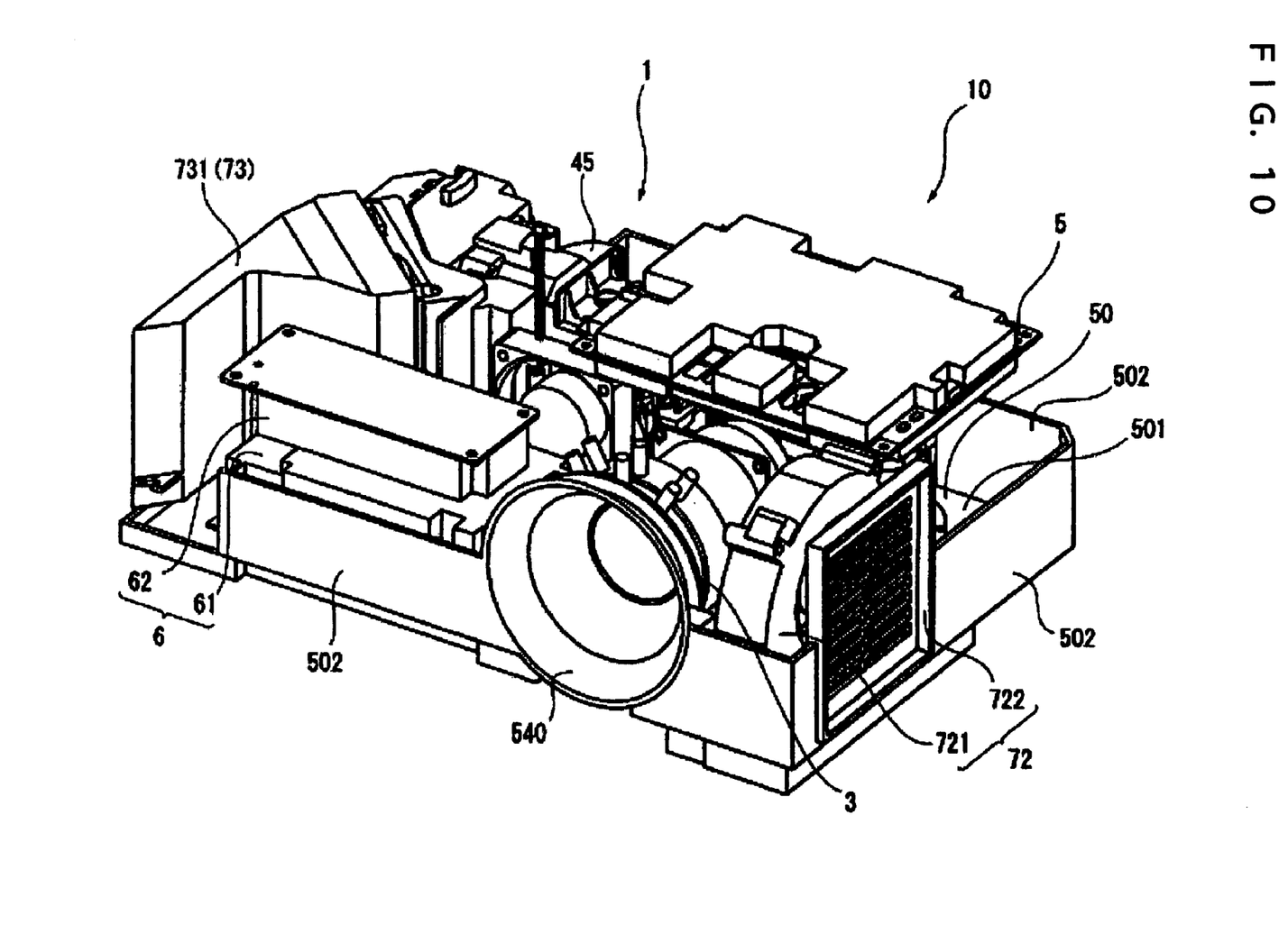
FIG. 10 is a perspective view showing another aspect of the internal structure of the projector of the exemplary embodiments.
Figure 11:
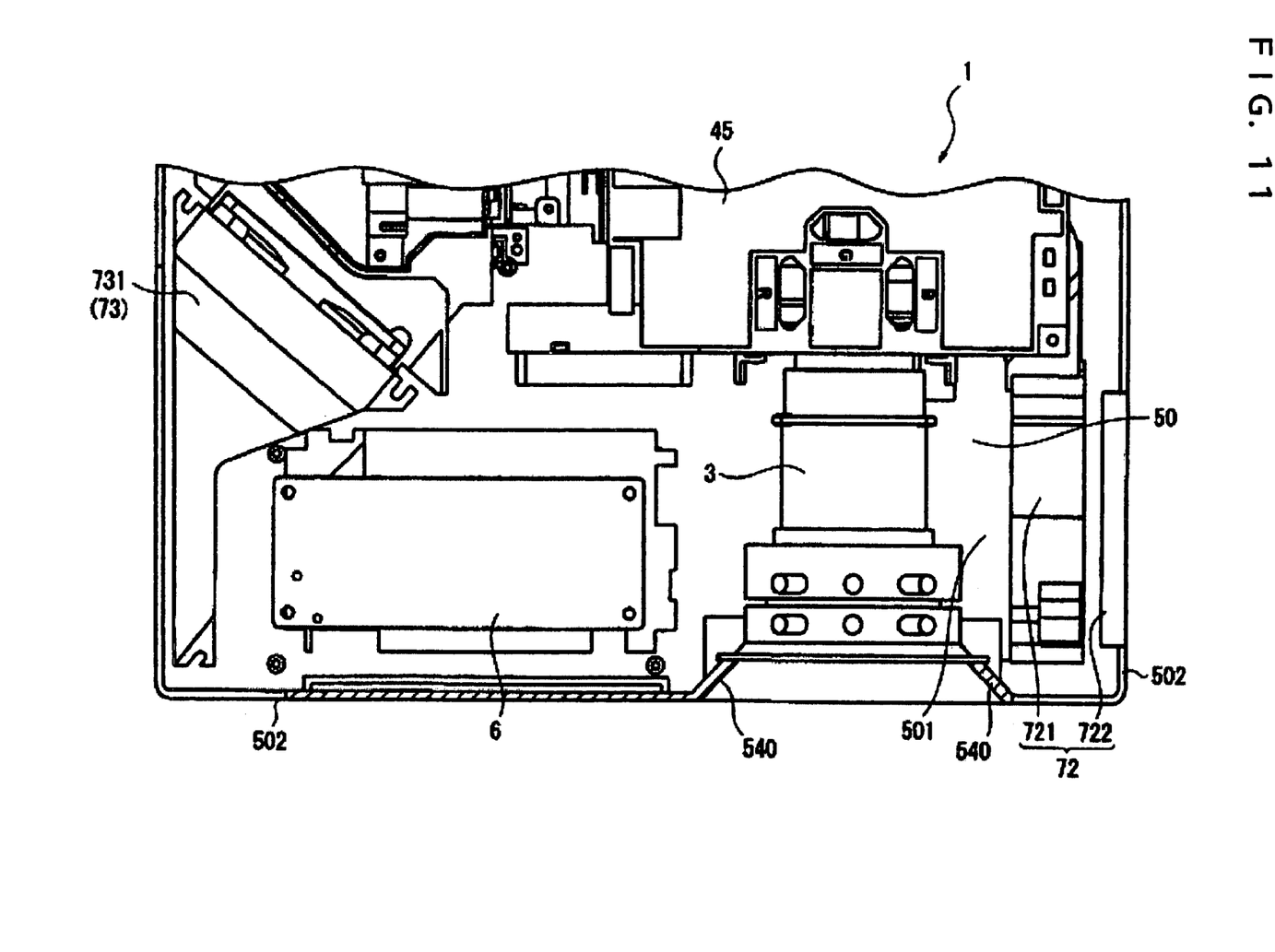
FIG. 11 is a perspective view showing still another aspect of the internal structure of the projector of the exemplary embodiments.

FIG. 10 is a perspective view showing another exemplary embodiment of the projector 10. FIG. 11 is a plan view showing another exemplary embodiment of the projector 10. In the lateral sides 502 of the partition member 50 of the projector 10 of these exemplary embodiments, a peripheral rib 540 is formed, and the peripheral rib 540 surrounds the front end of the projection lens 3.

In addition, FIGS. 10 and 11 show a state in which the DVD player serving as an image reproducing device is detached.

According to the structure shown in FIGS. 10 and 11, since the lateral side 502 surrounding the projector body 1 of the partition member 50 is formed with the peripheral rib 540, which surrounds the front end of the projection lens 3 that is a projection optical lens constituting the projector body 1, in addition to the advantages of the aforementioned (1) to (6), the projection direction can be made correct, and the projection efficiency of the projection lens 3 can be optimized.

Further, since the peripheral rib 540 is integrated with the lateral side 502 of the partition member 50, the number of components can be reduced, and the reduction in cost can be attained.

Further, even though the aforementioned exemplary embodiments have described the DVD player as an example of an image reproducing device, an image reproducing device is not limited to the DVD player. For example, the image reproducing device may be a videocassette recorder or the like.

Further, in the aforementioned exemplary embodiments, the substantially rectangular introducing port 510, which introduces heat of the DVD player 30, is disposed substantially at the lower center of the planar portion 501 in the partition member 50. However, the position where the introducing port 510 is formed is not at all restricted to the aforementioned descriptions, thus the introducing port 510 can be formed at any position of the partition member 50.

Accordingly, for example, the introducing port 510, which introduces heat, is desirably formed right above or around the position where a heat generating portion of an image reproducing device, such as the DVD player 30. The introducing port 510 may be formed distant from the aforementioned position that is right above or around the heat generating portion. Moreover, the shape of the introducing port 510 is not limited to the rectangular shape, and the optimal shape thereof can be properly determined.

Although the aforementioned exemplary embodiments have been described in conjunction with the aspect in which the suction unit 72 and the exhaust unit 73 of the projector body 1, and the suction unit 74 and the exhaust unit 75 of the DVD player 30 that is an image reproducing device, are respectively arranged adjacent to each other, the exemplary embodiments are not limited thereto. For example, the suction unit 72 (or exhaust unit 73) of the projector body 1, and suction unit 74 (or exhaust unit 75) of the DVD player 30 that is an image reproducing device, may be formed at positions separated from each other.

In the aforementioned exemplary embodiments, only the projector of front type which performs projection from the direction that observes a screen is exemplified, but the exemplary embodiments can be applied to a projector of rear type which performs projection from the direction opposite to the direction that observes a screen.

Although the best configuration for implementing the exemplary embodiments have been disclosed above, the exemplary embodiments are not limited to the described configuration. In other words, a person skilled in the art can modify the described specific configurations such as shape, material, quantity of the above-described exemplary embodiments as long as a technical idea and spirit and scope of the disclosed embodiments can be achieved.

For example, the terminology used to describe various elements of the invention should not be construed to limit such elements, such as the shape and the material of such elements. In other words, the exemplary embodiments cover any useable variation of all of the elements described above, and such elements are not limited by terminology used to describe such elements.

The projector of the exemplary embodiments include an image reproducing device such as a DVD player, which can be used for multiple purposes as a projector applied to multimedia representations in, for example, conventions, academic conferences, exhibitions, etc.

What is claimed is:

1. A projector, comprising:
   a projector body including,
      a light source,
      an optical modulator that modulates a light beam emitted from the light source according to image information, and a projection optical device that enlarges and projects image light modulated by the optical modulator; and
an image reproducing device that reproduces an image relating to the image light,
the projector body and the image reproducing device being integrally arranged in a vertical direction such that the projector body is above the image reproducing device;
a partition member between the projector body and the image reproducing device, the projector body being placed on the partition member, the partition member being formed with an introducing port that introduces heat from the image reproducing device; and
a heat generating portion in the image reproducing device being disposed right below or around the introducing port, and
a portion of the partition member facing the projector body being provided with a duct that communicates with the introducing port by air flow.

2. The projector according to claim 1,
the partition member being integrally formed with at least one of a part of or all of a duct in the projector body and the image reproducing device.

3. The projector according to claim 1,
the partition member being integrally formed with a lateral side that surrounds the projector body, and
the lateral side being formed with a peripheral rib that surrounds a front end of the projection optical device.

4. The projector according to claim 1,
an exhaust unit of the projector body and an exhaust unit of the image reproducing device being arranged adjacent to each other.

5. The projector according to claim 1,
the image reproducing device being a digital versatile disc (DVD) player.

* * * * *